United States Patent [19]
Ashby et al.

[11] Patent Number: 5,347,181
[45] Date of Patent: Sep. 13, 1994

[54] INTERFACE CONTROL LOGIC FOR EMBEDDING A MICROPROCESSOR IN A GATE ARRAY

[75] Inventors: Laurin R. Ashby, Mesa, Ariz.; Franz Steininger, Munich, Fed. Rep. of Germany

[73] Assignee: Motorola, Inc., Schaumburg, Ill.

[21] Appl. No.: 875,508

[22] Filed: Apr. 29, 1992

[51] Int. Cl.$^5$ ......................................... H03K 19/177
[52] U.S. Cl. .................... 307/465; 307/475; 395/800
[58] Field of Search ............... 307/443, 465, 475, 473; 395/800; 364/490–491

[56] References Cited

U.S. PATENT DOCUMENTS

| | | | |
|---|---|---|---|
| 4,634,426 | 1/1987 | Kamen | 604/65 |
| 4,809,029 | 2/1989 | Matsumura et al. | 364/900 |
| 4,987,578 | 1/1991 | Akins et al. | 307/475 X |
| 5,024,004 | 8/1991 | Agrawal et al. | 367/465 X |
| 5,124,942 | 6/1992 | Nielsen et al. | 364/DIG. 2 |
| 5,134,314 | 7/1992 | Wehrmacher | 307/443 |
| 5,187,797 | 2/1993 | Nielsen et al. | 395/800 |

*Primary Examiner*—David R. Hudspeth

[57] ABSTRACT

An interface circuit (14) that allows for a flexible three-way interface between a microprocessor (12), an ASIC cell block (16), and the external world has been provided wherein the microprocessor and the ASIC cell block are fabricated within a gate array (10). The interface circuit provides circuitry for each I/O pin (22, 23, 24) of the microprocessor to allow it to readily interface with the customer designed ASIC cell block or external devices via the ASIC I/O pads (20). The interface circuit also allows isolated testing of only the microprocessor, of only the ASIC cell block, or of both the microprocessor and the ASIC cell block. The interface circuit and the microprocessor are fully diffused and fixed-placed within the gate array while the ASIC cell block may be utilized by a customer to design a circuit to perform a customer defined function.

11 Claims, 7 Drawing Sheets

INTERFACE CONTROL LOGIC FOR EMBEDDING A MICROPROCESSOR IN A GATE ARRAY

FIELD OF THE INVENTION

This invention relates to interface circuits, for example, an interface circuit for embedding a microprocessor core in a standard cell or gate array.

BACKGROUND OF THE INVENTION

Microprocessors are chief processing units within the electronics industry. They are utilized in a myriad of applications such as computers.

It is highly desirable to embed a microprocessor within an ASIC gate array where the ASIC cells may be utilized to perform specific functions. One attempt at embedding a core processor within a custom integrated circuit has been implemented by Motorola on the MC68302 integrated circuit. However, this integrated circuit includes an interface circuit between the core processor and the custom logic that is specifically designed for one environment and one predetermined function. Thus, the MC68302 lacks flexibility and is restrictive in its capability because the ASIC customer cannot use the ASIC cells for any other applications.

Hence, there exists a need to allow an ASIC customer to design a gate array on the same piece of silicon as a core microprocessor wherein an interface control logic circuit exists to allow flexible interface between the core processor and the ASIC cells.

SUMMARY OF THE INVENTION

Briefly, there is provided a gate array having a plurality of I/O pads comprising a microprocessor circuit, an ASIC cell block and an interface circuit. The microprocessor circuit has a plurality of microprocessor I/O pads and is fully diffused and fixed-placed within the gate array. The ASIC cell block provides a customer defined predetermined function. The interface circuit provides a flexible interface between the microprocessor I/O pads, the ASIC cell block and the plurality of I/O pads of the gate array, the interface circuit being fully diffused and fixed-placed within the gate array.

The present invention will be better understood from the following detailed description taken in conjunction with the accompanying drawings.

DETAILED DESCRIPTION OF THE DRAWINGS

Figure 1:
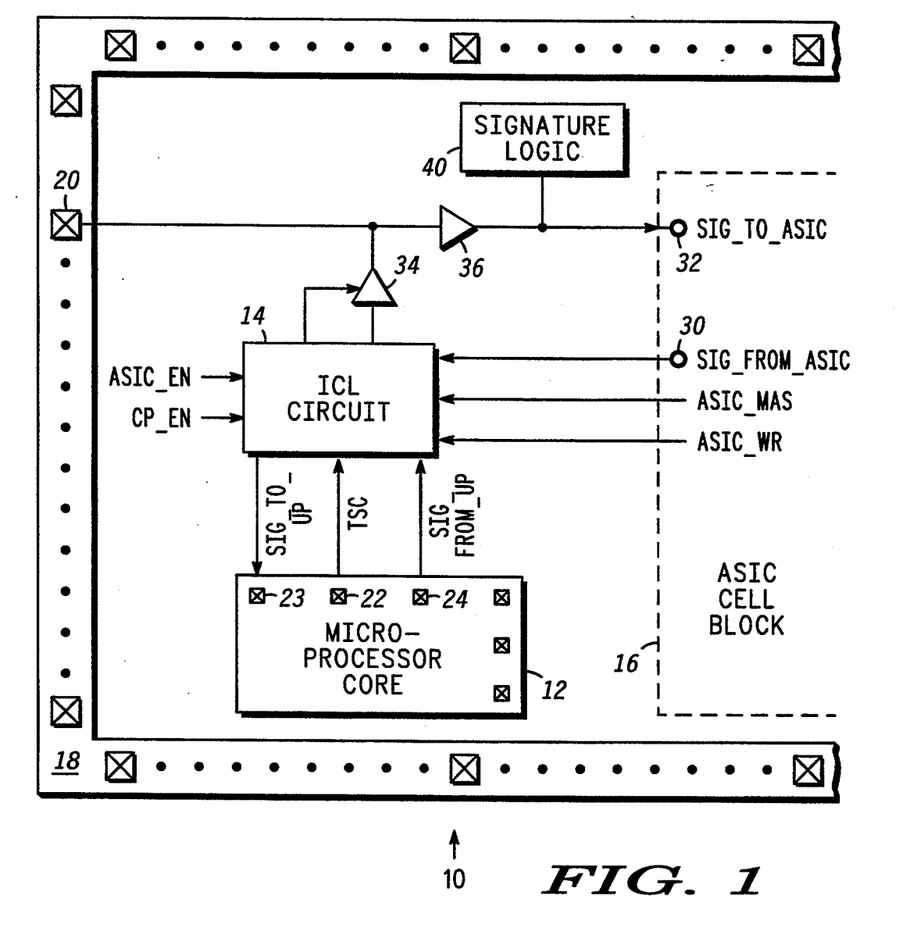
FIG. 1 is a block diagram illustrating a gate array having an interface control logic circuit for providing a flexible interface between a microprocessor core and an ASIC cell block within the gate array.

Referring to FIG. 1, a block diagram illustrating a portion of gate array 10 is shown. Gate array 10 includes microprocessor core 12, interface control logic (ICL) circuit 14 and ASIC cell block 16. Gate array 10 also includes I/O pad region 18 having a plurality of ASIC I/O pads such as I/O pad 20.

Microprocessor core 12 includes a plurality of I/O pads, for example pads 22–24, which are coupled to interface control logic circuit 14. It is worth noting that there exists a plurality of microprocessor pads like 22–24 which are coupled to ICL circuit 14, but only a few are shown for simplicity. In particular, I/O pad 22 is shown providing tri-state control (TSC) signal to ICL circuit 14, while I/O pad 24 provides a signal from microprocessor core 12 to ICL circuit 12 as denoted by SIC_FROM_UP. Also, I/O pad 23 is shown to receive a signal frown ICL circuit 14 as denoted by SIC_TO_UP. The microprocessor core I/O pads are typically implemented in a bi-directional configuration with the exception of the clock input. It is understood that microprocessor core 12 is fully diffused and fixed placed within gate array 10. Further, one example of microprocessor core 12 is the Motorola MC68000 (CP000) microprocessor core which is fully compatible with a standard MC68000 processor.

Interface control logic circuit 14 is comprised of standard gate array macros (such as those found in ASIC cell block 16) which are utilized to provide an interface between microprocessor core 12, ASIC cell block 16, and the external world via ASIC I/O pads such as I/O pad 20. In this manner, interface control logic circuit 14 allows a very flexible three-way communication between microprocessor core 12, ASIC cell block 16 and any external sources. Similar to microprocessor core 12, interface control logic circuit 14 is also fixed-placed within gate array 10, but is built from typical gate array macros.

Signals ASIC_MAS and ASIC_WR are two logic signals provided to ICL circuit 14 from ASIC cell block 16. Signal ASIC_MAS indicates ASIC mastership. When signal ASIC_MAS is a logic high, the signal direction is controlled by signals generated within ASIC cell block 16. In general, signal ASIC_MAS is asserted in the following three cases: 1) in normal application mode when the ASIC is providing a signal to microprocessor core 12, for example when microprocessor core 12 reads data from ASIC cell block 16; 2) if the ASIC becomes master of the bus and signals will be sourced by ASIC cell block 16. 3) if the customer redefines a microprocessor core I/O pin as an ASIC I/O pin in the application mode.

Further, signal ASIC_WR controls the tri-state control for the signals if signal ASIC_MAS is asserted. This applies to the normal mode operation wherein in the test mode, the direction is controlled by ICL circuit 14 or microprocessor core 12. A signal ASIC_MAS and ASIC_WR are provided for each pin of micrprocessor core 12 which allows for separate bus mastership by either microprocessor core 12, ASIC cell block 16 or an external device (via ASIC I/O pads such as pad 20). Further, signals ASIC_MAS and ASIC_WR also provide for ASIC I/O pads such as pad 20 to be redefined as an input or an output.

As shown, interface control logic circuit 14 further includes input signals CP_EN and ASIC_EN which are off-chip signals used to set interface control logic circuit 14 in one of four modes. Table 1 shows the logic states of signals ASIC_EN and CP_EN for the different modes.

TABLE 1

| ICL Circuit Modes | | |
|---|---|---|
| ASIC_EN | CP_EN | MODE |
| 0 | 0 | 0 |

TABLE 1-continued

| ICL Circuit Modes | | |
|---|---|---|
| ASIC_EN | CP_EN | MODE |
| 0 | 1 | 1 |
| 1 | 0 | 2 |
| 1 | 1 | 3 |

Briefly, mode 0 is known as the in-circuit test mode. This mode allows the customer to do in-circuit testing with the ASIC device in place. In this mode all microprocessor core 12 output signals are high impedance, but can be driven as inputs to ASIC cell block 16 or microprocessor core 12. Further, I/O pads such as I/O pad 20 must be tri-state (high impedance) during the in-circuit test mode. Also, signals ASIC_MAS, ASIC_WR and control signals from microprocessor core 12 are ignored.

Mode 1 is known as the stand alone microprocessor test mode. In this mode, ASIC cell block 16 is isolated to allow microprocessor core 12 to be tested. Signals ASIC_MAS and ASIC_WR are ignored, while the tri-state control for ASIC I/O pads such as I/O pad 20 is generated by microprocessor core 12.

Mode 2 is known as the stand alone ASIC test mode. In this mode microprocessor core 12 is isolated thereby allowing stand alone testing of ASIC cell block 16. Signal ASIC_MAS and the control signals from microprocessor 12 are ignored, while the tri-state of the ASIC I/O pads are controlled by signal ASIC_WR.

Finally, mode 3 is known as the normal application mode. During this mode, tri-state control signals for the ASIC I/O pads are generated by microprocessor core 12 or ASIC cell block 16 depending upon the logic state of signal ASIC_MAS.

Further, interface control logic circuit 14 is coupled to terminal 30 for receiving a signal from ASIC cell bock 16 as denoted by signal SIG_FROM_ASIC. Also, interface control logic circuit 14 provides an output to either I/O pad 20 or terminal 32 via buffers 34 and 36, respectively. It is understood that terminal 32 provides a signal to ASIC cell block 16 as denoted by signal SIG_TO_ASIC. Also, it is understood that buffers 34 and 36 may be incorporated within I/O pad 20. It is worth noting that although only one signal to and from ASIC cell block 16 are shown (SIG_TO_ASIC and SIG_FROM_ASIC), there may be a plurality of signals from ASIC cell block 16 provided to ICL circuit 14 (similar to signal SIG_FROM_ASIC), and a plurality of signals provided from ICL circuit 14 to ASIC cell block 16 (similar to SIG_TO_ASIC). Further, it should be understood that for example "SIG_FROM_ASIC" is a general signal name that is used to represent a typical signal that originates from ASIC cell block 16. Thus, each time SIG_FROM_ASIC is used for each Figure, it does not necessarily refer to the same signal.

Signature logic block 40 is shown coupled between ICL circuit 14 and ASIC cell block 16. Signature logic block 40 includes signature analysis circuitry which allows for complete fault coverage testing of ICL circuit 14 when microprocessor core 12 is being tested as in mode 1. Signature logic block 40 provides adequate fault coverage of ICL circuit 14 and also ensures that ICL circuit 14 has not been modified. It is understood that signature block 40 is typically included within ICL circuit 14.

As an example, a signal from microprocessor core 12 which appears at I/O pad 24 can be sent through ICL circuit 14 and to either ASIC I/O pad 20 or to ASIC cell block 16 (via terminal 32). In specific, a signal appearing at I/O pad 24 may be an address output signal which may be utilized to access either an external device via ASIC I/O pad 20, or ASIC cell block 16 via terminal 32.

Thus, the present invention provides a flexible 3-way interface between microprocessor core 12, ASIC cell block 16 and the external world. This enables a customer to utilize cells within ASIC cell block 16 to design a gate array to perform customer defined functions wherein this customer designed gate array will readily interface with microprocessor core 12.

Figure 2:
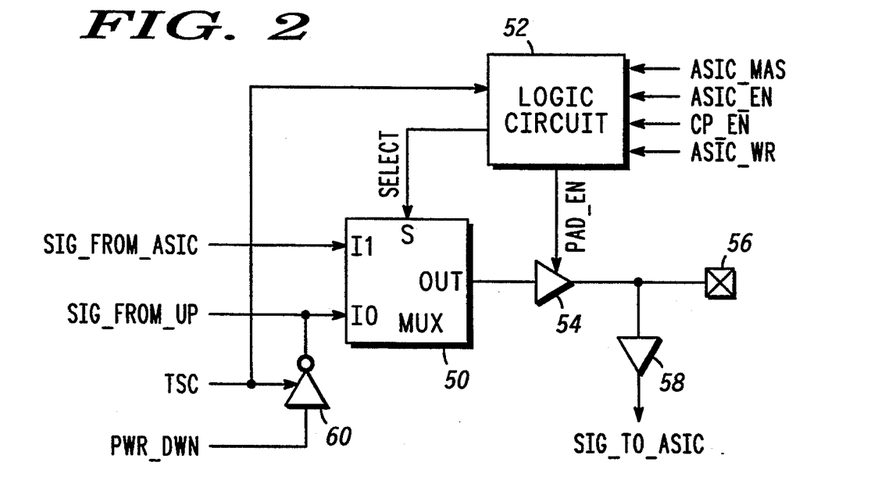
FIGS. 2 and 4–13 are a partial schematic/block diagrams illustrating various circuits existing within the interface control logic circuit shown in FIG. 1.

Referring to FIG. 2, a portion of interface control logic circuit 14 is shown for a tri-state output from microprocessor core 12, for example, an address output. The circuit of FIG. 2 includes multiplexor 50 having a first input coupled to receive a signal from microprocessor core 12 (SIG_FROM_UP) which may be output from microprocessor core I/O pad 24. A second input of multiplexor 50 is coupled to receive a signal from ASIC cell block 16 as denoted by signal SIG_FROM_ASIC. Signal SIG_FROM_ASIC may be provided to interface control logic circuit 14 via a terminal similar to terminal 30. Logic circuit 52, which is part of interface control logic circuit 14, is responsive to signals ASIC_EN, CP_EN, ASIC_MAS and ASIC_WR to provide logic signals SELECT and PAD_EN respectively to the SELECT input of multiplexor 50 and the control input of tri-state buffer 54. The output of multiplexor 50 is coupled to an input of tri-state buffer 54 while the output of tri-state buffer 54 is coupled to ASIC I/O pad 56 which may be for example ASIC I/O pad 20. The output of tri-state buffer 54 is coupled to an input of buffer 58 the output of which provides a signal to ASIC cell block 16 via signal SIG_TO_ASIC. As previously mentioned for buffers 34 and 36 of FIG. 1, buffers 54 and 58 may be incorporated within ASIC I/O pad 56. In addition, the circuit in FIG. 2 includes tri-state buffer 60 which has an input for receiving signal PWR-DWN and an output coupled to the first input of multiplexor 50. The control input of inverting tri-state buffer 60 is responsive to tri-state control signal TSC.

Table 2 shows the mode and control signals of ICL circuit 14 for a tristate output of microprocessor core 12.

TABLE 2

| Mode and Control Signals (of ICL Circuit 14) for a Tri-state output of UProcessor Core 12 | | | | | | | |
|---|---|---|---|---|---|---|---|
| ROW | ASIC_EN | CP_EN | MODE | ASIC_MAS | ASIC_WR | SELECT | PAD_EN |
| 1 | 0 | 0 | 0 | X | X | 0 | 0 |
| 2 | 0 | 1 | 1 | X | X | 0 | Follow TSC Signal |
| 3 | 1 | 0 | 2 | 0 | X | 0 | Follow TSC Signal |
| 4 | 1 | 0 | 2 | 1 | 0 | 1 | 0 |
| 5 | 1 | 0 | 2 | 1 | 1 | 1 | 1 |
| 6 | 1 | 1 | 3 | 0 | X | 0 | Follow TSC Signal |
| 7 | 1 | 1 | 3 | 1 | 0 | 1 | 0 |

TABLE 2-continued

| Mode and Control Signals (of ICL Circuit 14) for a Tri-state output of UProcessor Core 12 | | | | | | | |
|---|---|---|---|---|---|---|---|
| ROW | ASIC_EN | CP_EN | MODE | ASIC_MAS | ASIC_WR | SELECT | PAD_EN |
| 8 | 1 | 1 | 3 | 1 | 1 | 1 | 1 | where "X" denotes a don't care.

In particular, in mode 0, signals SELECT and PAD_EN are a logic low and ASIC I/O pad 56 is tri-stated. It is worth noting that for all portions of ICL circuit 14 operating in mode 0, all ASIC I/O pads are tri-stated.

In mode 1 microprocessor core 12 is being tested while ASIC cell block 16 is isolated. Signals ASIC_MAS and ASIC_WR are ignored and the tri-state controls of the ASIC I/O pads are generated by control signals of microprocessor core 12 as aforementioned. The supported data path for mode 1 is a signal from the microprocessor core 12 (SIG_FROM_UP), through multiplexor 50, through buffer 55 and to both ASIC I/O pad 56 and through buffer 58 to ASIC cell block 16 to provide SIG_TO_ASIC.

In mode 2, microprocessor core 12 is isolated allowing stand alone testing of ASIC cell block 16. Control signals from microprocessor core 12 as well as signal ASIC_MAS are ignored. Further, the tri-state control signals of ASIC pads are generated via signal ASIC_WR.

In this mode, the supported data paths exists from ASIC cell block 16 to pad 56 and back to ASIC cell block 16 via buffer 58. Another supported signal path is utilizing ASIC I/O pad 56 as an ASIC input wherein an external signal is sent to ASIC cell block 16 via buffer 58.

These signal paths for mode 2 may be explained in more detail by referring to rows 3–5 of table II. For example, in row 4 signal ASIC_MAS is a logic high which indicates that the ASIC is the master and the signal appearing at ASIC I/O pad 56 is redefined as an ASIC input since signal ASIC)WR is a logic low. The supported data path is through I/O pad 56 and through buffer 58 to ASIC cell block 16.

Referring to row 5, signal ASIC_MAS is a logic high indicating that the ASIC is the master and the signal appearing at I/0 pad 56 is redefined as an ASIC output since signal ASIC_WR is a logic high. The supported data path flows from ASIC cell block 16 via SIG_FROM_ASIC through multiplexor 50, through tri-state buffer 54 and to both pad 56 and through buffer 58 back to ASIC cell block 16.

Referring to row 3, it should be noted that this essentially is an invalid set up since signal ASIC_MAS is a logic low this means that microprocessor core 12 is the master which is inconsistent with the fact that: in mode 2 microprocessor core 12 is isolated. Thus, to have signal PAD_EN follow the tri-state control signal of microprocessor core 12 is inconsistent.

In mode 3 which the normal application mode, the tri-state control of ASIC I/O pads are generated by microprocessor core 12 or by signal ASIC_WR depending on the logic state of signal ASIC_MAS. In this mode, the supported data paths are essentially from pad 56 to ASIC cell block 16 when microprocessor core 12 is the master, and from ASIC cell block 16 to pad 56 when the ASIC is the master.

These signal paths for mode 3 may be explained in more detail by referring to rows 6–8 of table II. Referring to row 6, microprocessor core 12 is the master, and ASIC I/O pad 56 is an output unless it is tri-stated by signal TSC of microprocessor core 12 as indicated by the "follow TSC signal" in the PAD_EN column. Thus, as long as microprocessor core 12 outputs data, this data is output to I/O pad 56. The supported data path in this set up is from microprocessor core 12, through multiplexer 50, and through tri-state buffer 54 to both ASIC pad 56 and through buffer 58 back to ASIC cell block 16.

Referring to row 7, signal ASIC_MAS is a logic high and the ASIC is the master, and the signal appearing at ASIC pad 56 is redefined as an ASIC input since signal ASIC_WR is a logic low. The supported data path is from ASIC pad 56 through buffer 58 to ASIC cell block 16. This configuration represents a case where an external processor is bus master.

Referring to row 8, the ASIC is again the master as indicated by signal ASIC_MAS being a logic high and the signal appearing at ASIC pad 56 is redefined as an ASIC output since signal ASIC_WR is a logic high. The supported data path is from ASIC cell block 16 via signal SIG_FROM_ASIC, through multiplexor 50, through tri-state buffer 54 and to both ASIC pad 56 and through buffer 58 back to ASIC cell block 16.

Referring to tri-state buffer 60, a method for actively pulling the voltage appearing at the first input of multiplexor 50 to a predetermined logic state via signal PWR_DWN is shown. In some low power modes, it may be desired to power down microprocessor core 12 so as to conserve power while maintaining power to ASIC cell block 16. In accomplishing this goal, the first step is to provide independent and separate power supply pins for microprocessor core 12 and ASIC cell block 16 so that microprocessor core 12 may be powered down and ASIC cell block 16 may remain powered up (this will be discussed in detail hereinafter). However, this simple measure is not enough because tri-state nodes from microprocessor core 12 that are left floating will consume a substantial amount of power for CMOS applications. Therefore, a second step is performed wherein all microprocessor outputs, which are coupled to circuitry that is still powered up, are maintained at predetermined logic voltage levels. Although only one output of microprocessor core 12 is shown to have such power down capability, it should be understood that every tri-state output of microprocessor core 12 includes power down logic circuitry similar to tri-state buffer 60.

Briefly, when signal TSC goes high, tri-state buffer 60 is rendered operative and the voltage level appearing at the first input of multiplexor 50 is pulled to a predetermined level via signal PWR_DWN. For example if signal PWR_DWN was a logic high, the first input of multiplexor 50 would be a logic low. It should be understood that this phenomena exists because microprocessor core 12 is a dynamic element and when the clock is stopped the CMOS transistors essentially go into linear region and draw substantially more current than usually. Thus, if power is to be saved the power to microprocessor core 12 must be turned off and the outputs of microprocessor core 12 must be tied to a predetermined logic state.

Figure 3:
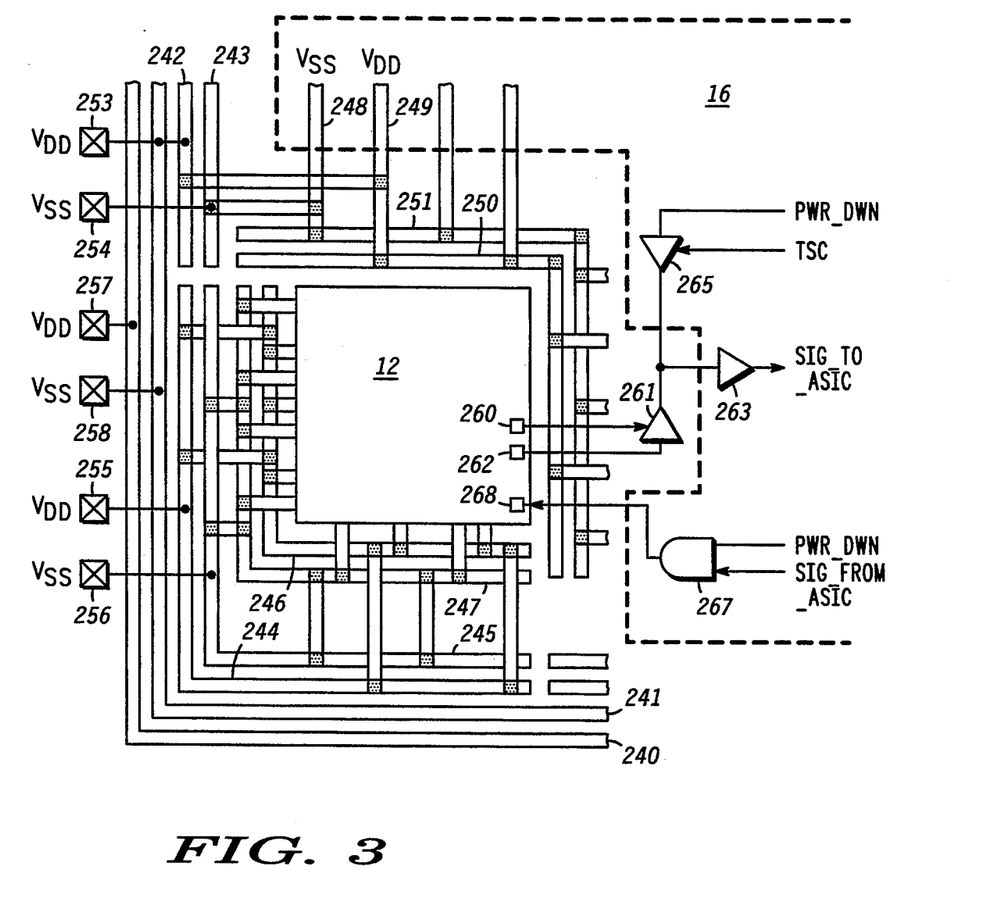
FIG. 3 is a block diagram illustrating power isolation between the microprocessor core and the ASIC cell block.

Referring to FIG. 3, the power isolation of microprocessor core 12 from ASIC cell block 16 is shown. In particular, external power supply busses 240-241 respectively provide voltages $V_{DD}$ and $V_{SS}$ to I/O pads such as pad 20 of FIG. 1. Further, internal power supply busses 242—243 respectively provide voltages $V_{DD}$ and $V_{SS}$ to the inside of ASIC cell block 16, while power supply busses 244 and 245 respectively provide voltages $V_{DD}$ and $V_{SS}$ to power rings 246 and 247 of microprocessor core 12. Finally, power busses such as 248 and 249 represent a portion of the internal power grid within ASIC cell block 16 wherein termination busses 250 and 251 are utilized to terminate the internal power grid structure of ASIC cell block 16 to prevent connection with microprocessor core 12.

The aforedescribed structure allows independent power isolation between microprocessor 12 and ASIC cell block 16. Thus, ASIC I/O pads 253-256 can be utilized to provide separate and independent power to microprocessor core 12 (pads 255, 256) and to ASIC cell block 16 (pads 253, 254). Further, pads 257-258 are used to provide power to external power supply busses 240 and 241, respectively.

Microprocessor pad 260 is utilized to output signal TSC (tri-state control) to the control input of tri-state buffer 261. In addition, microprocessor pad 262 is shown to represent an output which is coupled to the input of buffer 261. The output of buffer 261 is coupled through buffer 263 to provide a signal to ASIC cell block 16. It is understood that buffer 261 may be incorporated within microprocessor pad 260, while buffer 263 is part of ASIC cell block 16. Tri-state buffer 265 operates in an identical fashion as aforedescribed for tri-state buffer 60 of FIG. 2 wherein tri-state buffer 265 functions to pull a microprocessor core output signal to a logic low to prevent floating of the output when microprocessor core 12 is powered down.

In addition, AND gate 267 functions to pull input signals to microprocessor core 12 to a logic low when core 12 is powered down thereby preventing any power from being applied to core 12. In particular, when signal PWR_DWN goes to a logic low (indicating power down of core 12) the output of AND gate 267 forces the voltage level appearing at pad 268 to a logic low.

Thus, the present invention includes a method for independently powering down microprocessor core 12, while power may be maintained to ASIC cell block 16. One advantage of such power isolation is that digital noise from ASIC cell block 16 is prevented from affecting the microprocessor core 12. Further, ASIC cell block 16 may be statically tested while core 12 is powered down. Microprocessor core 12 may also be powered down in an application thereby significantly reducing current drain which may be ideal for battery powered systems.

Figure 4:
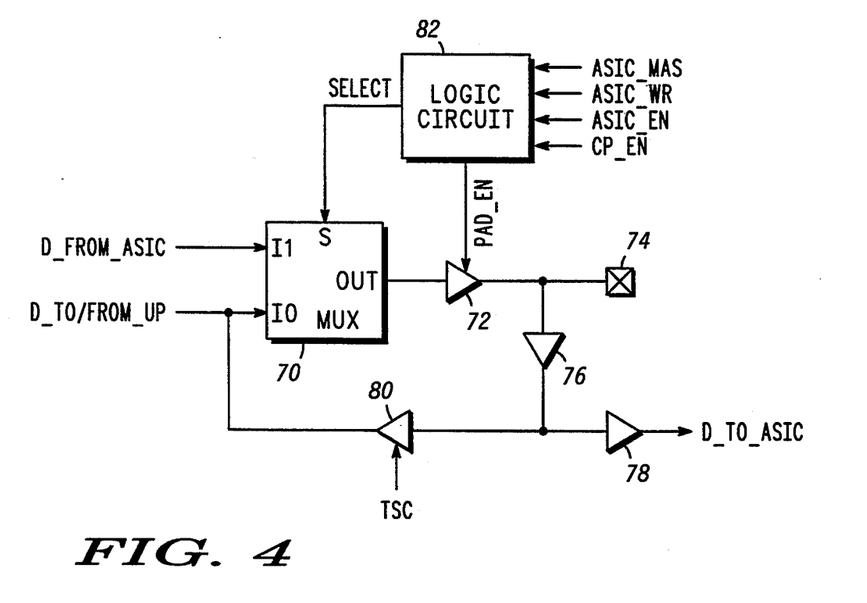

Referring to FIG. 4, a portion of interface control logic circuit 14 for a bi-directional data output (D0-D15) of microprocessor core 12 is shown. As for all the circuits shown in FIGS. 2-11, the circuit shown in FIG. 4 provides a three way interface between microprocessor 12, ASIC cell block 16 and any external devices which may be coupled to the ASIC I/O pads. The circuit of FIG. 4 accomplishes the same task of the circuit of FIG. 2, but it is a bit more complex because a signal is not just output from microprocessor core 12 but also is input since it is a bi-directional signal.

In particular, the circuit in FIG. 4 includes multiplexor 70 having a first input coupled to receive signal D_TO/FROM_UP and a second input coupled to receive signal D_FROM_ASIC which may be respectively provided via I/O pad 24 of microprocessor core 12 and terminal 30 as shown in FIG. 1. The output of multiplexor 70 is coupled through tri-state buffer 72 to ASIC I/O pad 74. Further, I/O pad 74 is coupled through buffers 76 and 78 to provide signal D_TO_ASIC which provides a data signal to ASIC cell block 16. Moreover, I/O pad 74 is coupled through buffer 76 and tri-state buffer 80 for providing a signal to microprocessor core 12 via signal D_TO/FROM_UP. It is understood as mentioned in FIG. 2 that tri-state buffer 72 and buffer 76 are respectively similar to tri-state buffer 34 and buffer 36 shown in FIG. 1 and further that these buffers may be incorporated within ASIC I/O pad 74. Further, ASIC I/O pad 74 is similar to ASIC I/O pad 20 as shown in FIG. 1. Logic circuit 82 is shown being responsive to signals ASIC_EN, CP_EN, ASIC_MAS and ASIC_WR for providing signals SELECT and PAD_EN respectively to the select input of multiplexor 70 and to the tri-state control input of tri-state buffer 72. Additionally, tri-state control buffer 80 is controlled by signal TSC which is the tri-state signal for the I/O pads of microprocessor core 12.

Referring to Table 3, the mode and control signals of interface control logic circuit 14 for a bi-directional data output of microprocessor core 12 is shown.

TABLE 3

| | Mode and Control Signals (of TCL Circuit 14) for a Bi-directional Data Output of UProcessor Core 12. | | | | | | |
|---|---|---|---|---|---|---|---|
| ROW | ASIC_EN | CP_EN | MODE | ASIC_MAS | ASIC_WR | SELECT | PAD_EN |
| 1 | 0 | 0 | 0 | X | X | 0 | 0 |
| 2 | 0 | 1 | 1 | X | X | 0 | TSC Signal |
| 3 | 1 | 0 | 2 | X | 0 | 1 | 0 |
| 4 | 1 | 0 | 2 | X | 1 | 1 | 1 |
| 5 | 1 | 1 | 3 | 0 | X | 0 | TSC Signal |
| 6 | 1 | 1 | 3 | 1 | 0 | 1 | 0 |
| 7 | 1 | 1 | 3 | 1 | 1 | 1 | 1 |

In a similar manner as Table 2 was utilized to explain the operation of the circuit shown in FIG. 2, Table 3 will be utilized to explain the operation of the circuit shown in FIG. 3.

Referring to Row 1, in mode 0 the entire circuit is in in-circuit test and I/O pad 74 is in a tri-state condition as aforedescribed.

Referring to Row 2, the circuit is in microprocessor test mode (mode and microprocessor core 12 controls the direction of I/O pad 74. The supported data paths during this mode are from the microprocessor through multiplexor 70, through tri-state buffer 72 and to ASIC I/O pad 74, or from ASIC I/O pad 74 through buffer 76 and tri-state buffer 80 back to microprocessor core 12. As noted in row 2, since microprocessor core 12 controls the direction of I/O pad 74, signal PAD_EN follows signal TSC which is generated by microprocessor core 12.

Referring to rows 3 and 4, the operation during mode 2 wherein the ASIC is tested and microprocessor core 12 is isolated is shown. In particular, row 4 supports the data path of data from the ASIC (signal D_FROM_ASIC), through multiplexor 70, through tri-state buffer 72 and to ASIC I/O pad 74. Row 3 on the other hand supports the data path from ASIC I/O pad 74, through buffers 76 and 78 and back to ASIC cell block 16.

Referring to rows 5-7, signal configurations for mode 3 are shown wherein mode 3 is the application mode. In particular, the configuration shown in row 5 denotes that microprocessor core 12 is master (ASIC_MAS is low). Microprocessor core 12 writes data off chip via pad 74, or to ASIC cell block 16, or microprocessor core 12 reads off-chip data depending upon the logic state of signal PAD_EN which follows signal TSC of microprocessor core 12.

Referring to row 6, ASIC cell block 16 is master since signal ASIC_MAS is a logic high and the ASIC reads off-chip data (ASIC_WR is a logic low) wherein the supported data path is through ASIC I/O pad 74 and through buffers 76 and 78 back to ASIC cell block 16.

Finally, referring to row 7, during this configuration microprocessor core 12 reads data from ASIC cell block 16 if microprocessor core 12 is bus master or ASIC cell block 16 writes data off-chip if ASIC cell block 16 is bus master. Thus, the supported data path is from ASIC cell block 16 through multiplexor 70, through tri-state buffer 72 and to ASIC I/O pad 74 when the ASIC is master. However, if microprocessor core 12 is bus master, the supported data path is from ASIC cell block 16 via multiplexor 70 to pad 74, and through buffer 76 and tri-state buffer 80 back to microprocessor core 12.

Figure 5:
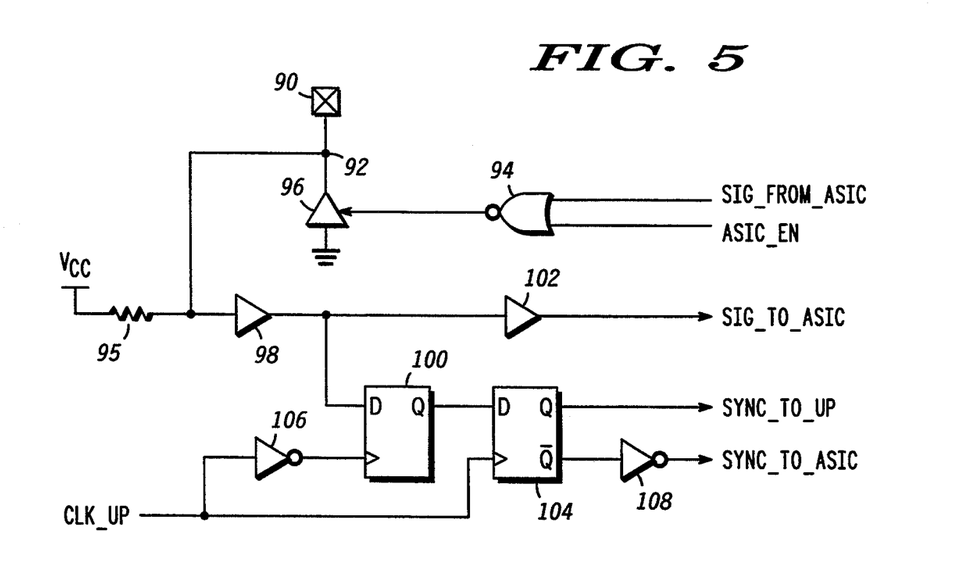

Referring to FIG. 5, a portion of interface control logic circuit 14 for synchronizing input signals (such as BGACKB, BERRB and VPAB) which are input to the microprocessor core 12 and must be synchronized to the internal clock of microprocessor core 12 is shown. By utilizing the circuit in FIG. 5, a signal is received via an ASIC I/O pad such as pad 20 and is synchronized through ICL circuit 14 to provide synchronous signals to both microprocessor core 12 and to ASIC cell block 16.

In particular, the circuit shown in FIG. 5 includes ASIC I/O pad 90 which is coupled to circuit node 92 wherein pad 90 is similar to ASIC I/O pad 20 of FIG. 1. NOR gate 94 has a first input coupled to receive a signal from ASIC cell block 16 as denoted by signal SIG_FROM_ASIC. A second input of NOR gate 94 is coupled to receive signal ASIC_EN. The output NOR gate 94 is coupled to the control input of tri-state buffer 96. Tri-state buffer 96 has an input returned to ground and an output coupled to circuit node 92. Circuit 92 is coupled to operating potential VCC via resistor 98 and to the input of buffer 98. The output of buffer 98 is coupled to the input of flip-flop 100, and also provides a signal to ASIC cell block 16 (signal SIG_TO_ASIC) via buffer 102. Clock signal CLK_UP of microprocessor core 12 is coupled to the clock input of flip-flop 104 and through inverter 106 to the clock input of flip-flop 100. The output of flip-flop 100 is coupled to the data input of flip-flop 104 while the non-inverting and inverting outputs of: flip-flop 104 provide synchronous signals to microprocessor core 12 and ASIC cell block 16, respectively, wherein the inverting output of flip-flop 104 provides signal SYNC_TO_ASIC through inverter 108 while the non-inverting output of flip-flop 104 provides signal SYNC_TO_UP.

It is worth noting that ASIC I/O pad 90 is just one pad that may be coupled to circuit node 92 which may supply a signal to microprocessor core 12 that needs to be synchronized. Further, a signal from ASIC cell block 16 via signal SIG_FROM_ASIC may also be synchronized with the clock of microprocessor core 12. This is accomplished in that when the voltage level appearing at circuit 92 is a logic low which subsequently allows the output of buffer 98 to be a logic low. This logic low level will then be synchronized with the microprocessor clock (CLOCK_UP) via flip-flops 100 and 104 thereby providing synchronous signals to microprocessor core 12 and ASIC cell block 16 via signals SYNC_TO_UP and SYNC_TO_ASIC. It is understood that since circuit node 92 may be responsive to a plurality of signals that must be synchronized to the microprocessor clock, resistor 95 along with the input of buffer 98 form an open drain wired-OR gate.

A truth table for the circuit shown in FIG. 4 is not necessary since signals AISC_EN and CP_EN are of the only concern. Thus, in mode 0, ICL circuit 14 is in the in circuit test and ASIC I/O pad 90 is tri-stated. In mode 1 microprocessor core 12 is being tested and the supported data path is from ASIC I/O pad 90 through buffer 98 and flip-flops 100 and 104 to provide signals to microprocessor core 12 and ASIC cell block 16. In addition, during mode 2 or 3 which are respectively the ASIC test mode or the application mode, the supported data path is from ASIC I/O pad 90 through buffer 98 and flip-flops 100 and 104 to provide signals to both microprocessor core 12 and ASIC cell block 16. Additionally, another supported path is from ASIC cell block 16 via signal SIG_FROM_ASIC through NOR gate 94 thereby allowing tri-state buffer 96 to provide a logic low at circuit node 92 when signal ASIC_ENB (the inversion of ASIC_EN) is a logic low.

Figure 6:
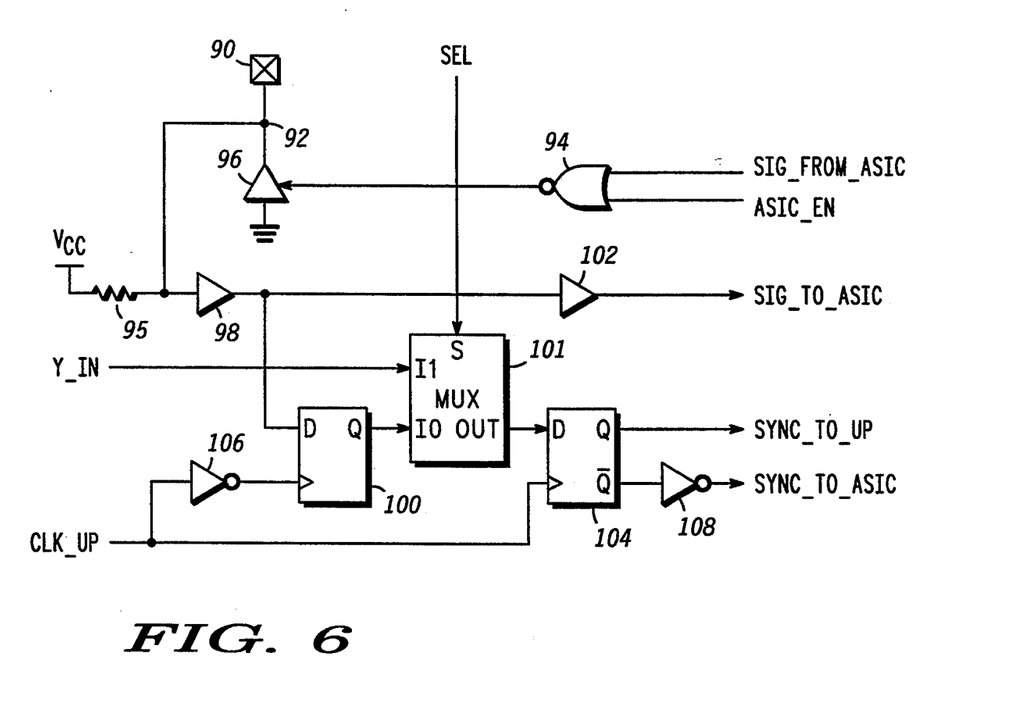

Referring to FIG. 6, a portion of interface control logic circuit 14 for synchronizing input signals (such as DTACKB) which is input to the microprocessor core 12 and must be synchronized to the internal clock of microprocessor core 12 is shown. The components shown in FIG. 6 which are identical to components shown in FIG. 5 are identified by the same reference numbers. The circuit in FIG. 6 further includes multiplexor 101 (coupled between flip-flops 100 and 104. Multiplexor 101 has a first input coupled to receive signal Y_IN (from ASIC cell block 16) and a second input coupled to the output of flip-flop 100. The output of multiplexor 101 is coupled to the data input of flip-flop 104. Finally, the select input of multiplexor 101 is coupled to receive signal SEL which is generated from ASIC cell block 16.

The operation of FIG. 6 is similar to the operation of the circuit shown in FIG. 5 except that multiplexor 101 now provides for early recognition (of $\frac{1}{2}$ of a clock cycle plus the data path delay of buffer 98 and either pad 90 or OR gate 94) of a data acknowledgement signal (DTACKB) via signal Y_IN which is generated by ASIC cell block 16.

Figure 7:
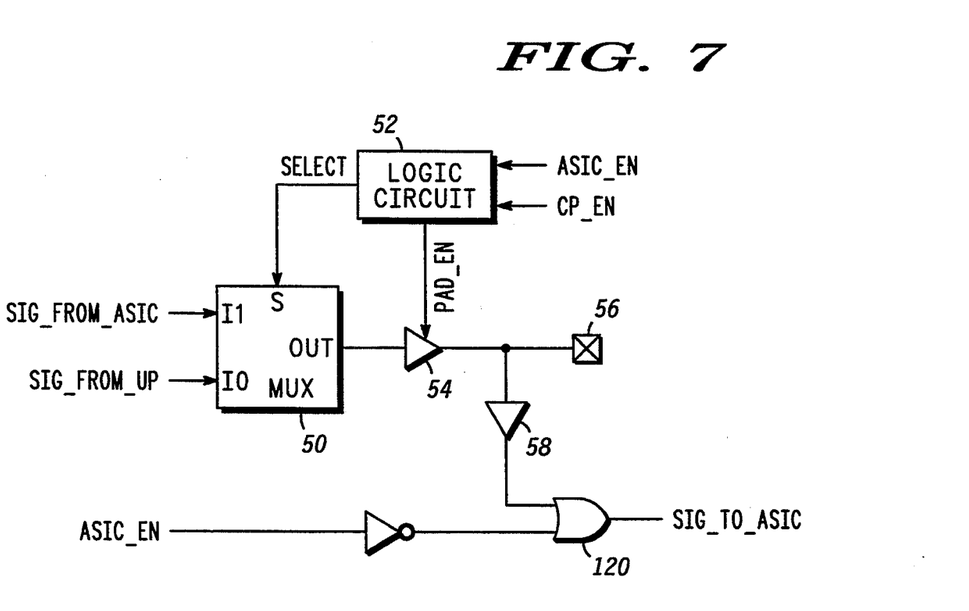

Referring to FIG. 7, a portion of ICL circuit 14 for tri-state outputs (such as ASB, UDSB and LDSB) of microprocessor core 12 is shown. It is understood that components shown in FIG. 7 which perform the same function as those shown in FIG. 2 are identified by the same reference numbers. Further, the circuit shown in FIG. 7 further includes OR gate 120 having a first input coupled to the output of buffer 58 and a second input coupled to receive signal CTRL_SIG. Finally, the output of OR gate 120 provides signal SIG_TO_ASIC to ASIC cell block 16.

The operation of the circuit shown in FIG. 7 is identical to the circuit shown in FIG. 2 with exception that OR gate 120 allows gated control of signal SIG_TO_ASIC before being sent to ASIC cell block 16. The addition of OR gate 120 allows signal SIG_TO_ASIC to be forced inactive during test mode of microprocessor core 12 thereby preventing false starting cycles within ASIC cell block 16. Further, the truth table for FIG. 7 is identical to the truth table for FIG. 2 as illustrated in table 2.

Figure 8:
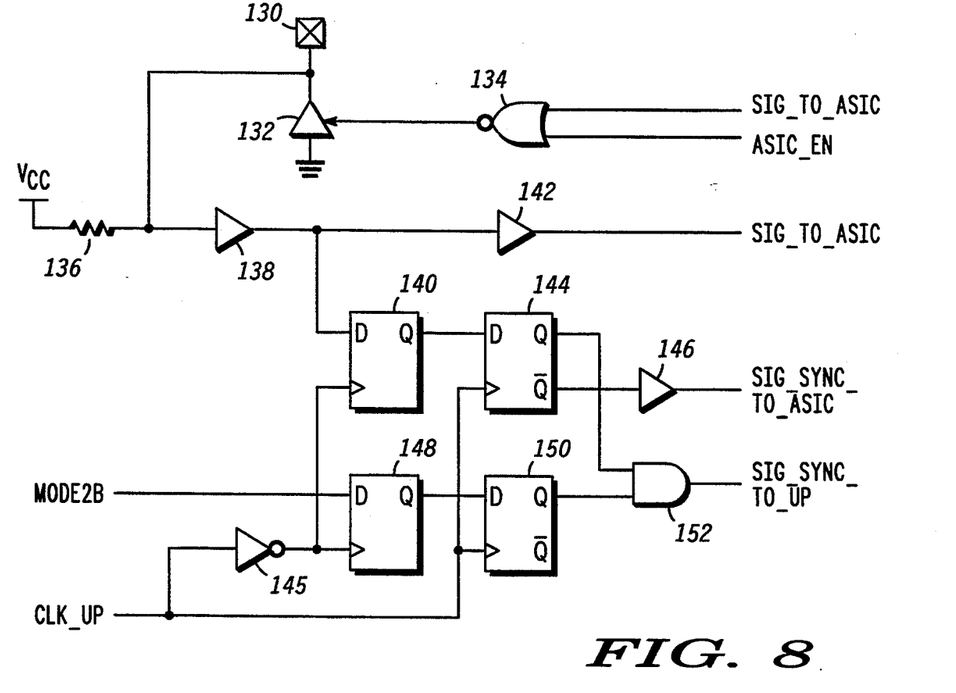

Referring to FIG. 8, a portion of interface control logic circuit 14 for an open drain input (such as BRB) of microprocessor core 12 is shown. Components 130, 132, 134, 136, 138, 140, 142, 144, 145 and 146 perform an identical function as components 90, 96, 94, 95, 98, 102, 100, 104, 106 and 108, respectively of FIG. 5. In addition, the circuit of FIG. 8 includes flip-flops 148 and 150 and AND gate 152 for forcing signal SYNC_TO_UP to a logic low during ASIC test mode (mode 2).

Figure 9:
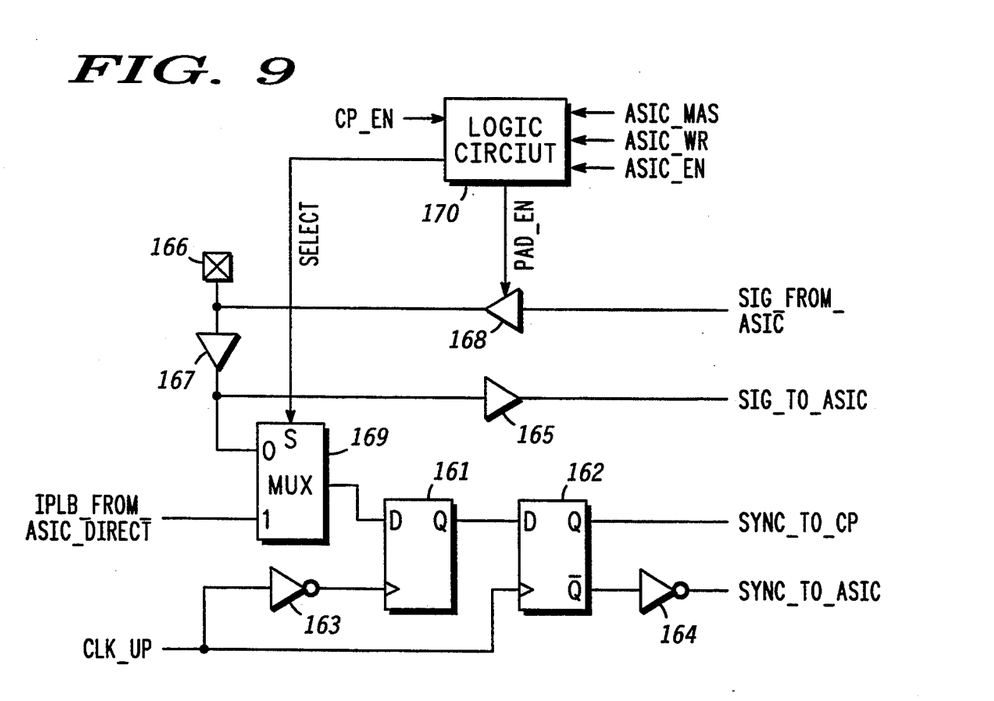

Referring to FIG. 9, a portion of ICL circuit 14 for inputs such as IPLB0, IPL1B and IPL2B of microprocessor core 12 is shown. Further, table 4 shows the mode and control signals of ICL circuit 14 for the circuit shown in FIG. 9.

TABLE 4

| Mode and control signals of ICL circuit 14 for microprocessor core 12 inputs IPL0B, IPL1B and IBL2B. | | | | | |
|---|---|---|---|---|---|
| ASIC_EN | CP_EN | ASIC_MAS | ASIC_WR | SELECT | PAD_EN |
| 0 | 0 | X | X | 0 | 0 |
| 0 | 1 | X | X | 0 | 0 |
| 1 | X | 0 | 0 | 0 | 0 |
| 1 | X | 0 | 1 | 0 | 1 |
| 1 | X | 1 | 0 | 1 | 0 |
| 1 | X | 1 | 1 | 1 | 1 |

Briefly, the circuit shown in FIG. 9 provides synchronous signals to microprocessor core 12 and ASIC cell block 16 via signals SYNC_TO_UP and SYNC_TO_ASIC. This is done in a similar manner as aforedescribed for the circuit shown in FIG. 5 by utilizing flip-flops 161 and 162 and inverters 163 and 164 thereby corresponding to flip-flops 100 and 104 of FIG. 5 and inverters 106 and 108 of FIG. 5. Further, the signal to be synchronized can come from an external source via pad 166, or from an ASIC signal via signal SIG_FROM_ASIC via tri-state buffer 168. Additionally, a signal can be sent directly from the ASIC via signal IPLB_FROM_ASIC_DIRECT via the second input of multiplexor 169. This may be used for example when the ASIC generates an interrupt. Also, a non-synchronized signal (signal SIG_TO_ASIC) may be sent to ASIC cell block 16 via buffer 165. Further, logic circuit 170 is shown for providing signals SELECT and PAD_EN.

Figure 10:
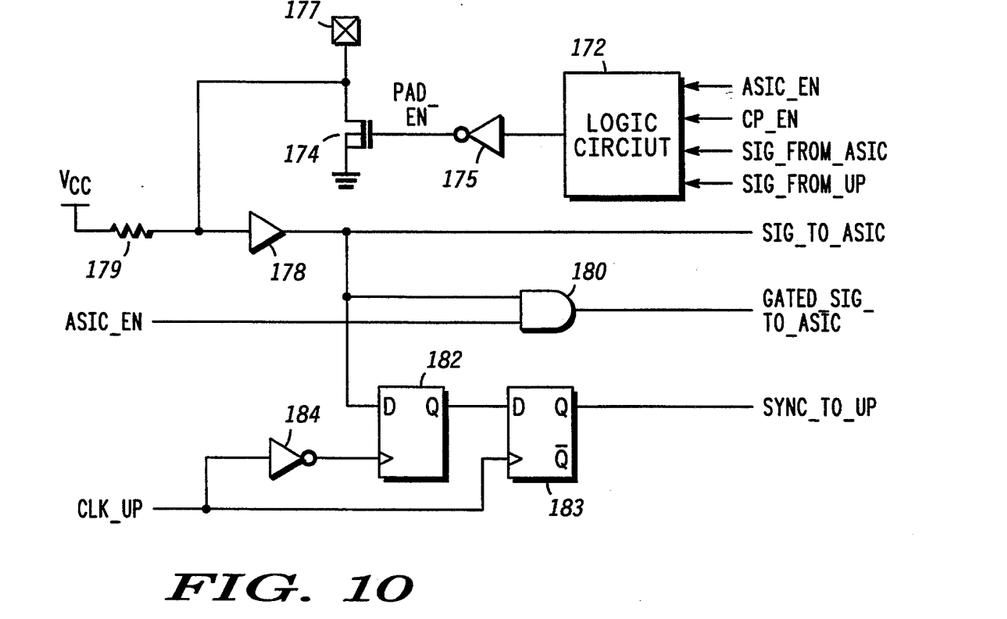

Referring to FIG. 10, a portion of ICL circuit 14 for microprocessor core 12 I/O signals such as RESETB and HALTB is shown. The circuit in FIG. 10 includes logic circuit 172 having inputs responsive to signals from microprocessor core 12 (signal SIG_FROM_UP) and from ASIC cell block 16 (SIG_FROM_ASIC). Logic circuit 172 also has inputs coupled to receive signals ASIC_EN and CP_EN. The output of logic circuit 172 supplies signal PAD_EN to the gate of transistor 174 via buffer 175.

The drain of transistor 174 is coupled to ASIC I/O pad 177 and to the input of buffer 178. The source and substrate of transistor 174 is returned to ground. The input of buffer 178 is also coupled to operating potential $V_{CC}$ via resistor 179.

The output of buffer 178 provides a signal to ASIC cell block 16 (SIG_TO_ASIC) and a gated signal (GATED_SIG_TO_ASIC) to ASIC cell block 16 by way of OR gate 180. Signal GATED_SIG_TO_ASIC is gated in the sense that the output of buffer 178 is OR'ed with signal ASIC_EN.

The output signal of buffer 178 is also synchronized with microprocessor core 12 by flip-flops 182 and 183 and inverter 184 (in a similar manner as aforedescribed for the circuit shown in FIG. 5) in order to provide synchronized signal SYNC_TO_UP to microprocessor core 12.

Referring to table 5, the mode and control signals of ICL circuit 14 for the RESET and HALTB pins of microprocessor core 12 are shown.

TABLE 5

| The Mode and control signals of ICL 14 for the RESETB and HALTB pins of microprocessor core 12. | | | |
|---|---|---|---|
| ASIC_EN | CPI_EN | MODE | PAD_EN |
| 0 | 0 | 0 | 0 |
| 0 | 1 | 1 | Follow SIG_FROM_UP |
| 1 | 0 | 2 | Follow SIG_FROM_ASIC |
| 1 | 1 | 3 | WIRED OR of SIG_FROM_UP and SIG_FROM_ASIC |

Briefly, RESETB and HALTB can be generated off-chip or by microprocessor core 12. Signal GATED_SIG_TO_ASIC is gated with signal ASIC_EN which forces signal GATED_SIG_TO_ASIC to a logic low during modes 0 and 1. Signal SIG_TO_ASIC is not gated and follows the signal appearing at I/O pad 177. Further, flip-flops 182 and 183 provide a synchronized signal to microprocessor core 12 in a similar manner as aforedescribed for the circuit of FIG. 5.

Figure 11:
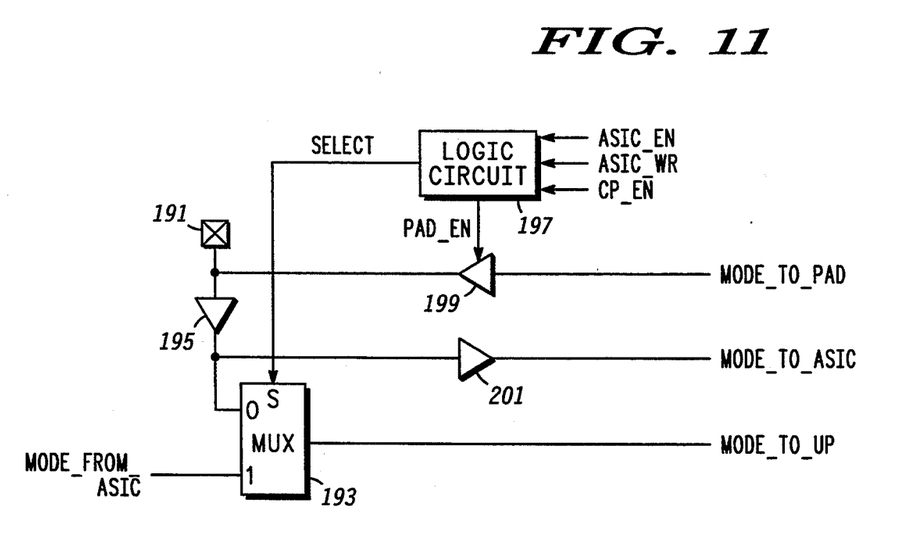

Referring to FIG. 11, a portion of ICL circuit 14 for the mode pin of microprocessor core 12 is shown. Briefly, the mode pin selects between 8 or 16 bit operation. If the mode pin is tied high, microprocessor core 12 will be in a 16 bit mode, and if the mode pin is tied low, microprocessor core 12 will be in an 8 bit mode. However, whenever the mode is changed, microprocessor core 12 must go through a reset sequence. In the application mode, signal MODE_FROM_ASIC controls the mode pin to microprocessor core 12. Typically, the mode pin is tied high or low, however, if the customers wants a dynamic access to the mode pin at the pad, the customer must connect signal MODE_TO_ASIC to signal MODE_FROM_ASIC to allow pad control in the application mode.

The circuit shown in FIG. 11 includes ASIC I/O pad 191 being coupled to the first input of multiplexer 193 via buffer 195. The second input of multiplexer of 193 is coupled to receive signal MODE_FROM_ASIC, while the select input of multiplexer 193 is coupled to an output of logic circuit 197. Tri-state buffer 199 has an input coupled to receive signal MODE_TO_PAD and an output coupled to ASIC I/O pad 191. It is understood that buffers 199 and 195 may be incorporated into I/O pad 191 as aforedescribed for other similar ASIC I/O pads. The control input of tri-state buffer 199 is coupled to receive signal PAD_EN from logic circuit 197. Further, logic circuit 197 has inputs for receiving signals ASIC_EN and CP_EN. Also, the output of buffer 195 supplies a signal MODE_TO_ASIC via buffer 201.

Referring to table 6, the mode and control signals of ICL circuit 14 for the mode pin of microprocessor core 12 is shown.

TABLE 6

| Mode and control signals of ICL circuit 14 for the MODE pin of microprocessor core 12. | | | | | |
|---|---|---|---|---|---|
| ASIC_EN | CP_EN | ASIC_MAS | ASIC_WR | SELECT | PAD_EN |
| 0 | 0 | 0 | x | 0 | 0 |
| 0 | 1 | 1 | x | 0 | 0 |
| 1 | x | 2,3 | 0 | 1 | 0 |
| 1 | x | 2,3 | 1 | 1 | 1 |

During modes 0 and 1, the supported data path is from ASIC I/O pad 191 through buffers 195 and 201 to provide signal MODE_TO_ASIC and through buffer 195 through multiplexer 193 to provide signal MODE_TO_UP.

In the ASIC test mode or the application mode, signal SELECT is a logic high. Further, when signal PAD_EN is a logic low, the supported data path is from I/O pad 191 through buffers 195 and 201 to provide signal MODE_TO_ASIC wherein the mode of microprocessor core 12 is controlled by signal MODE_FROM_ASIC. It is worth noting that in this configuration ASIC I/O pad 191 may be redefined as an ASIC input However, if pad ENABLE is a logic 1, the supported data path is from signal MODE_TO_PAD through tri-state buffer 199 to ASIC I/O pad 191 wherein again the mode of microprocessor core 12 is controlled by signal MODE_FROM_ASIC. It is worth noting that in this configuration ASIC I/O pad 191 may be redefined as an ASIC output.

Figure 12:
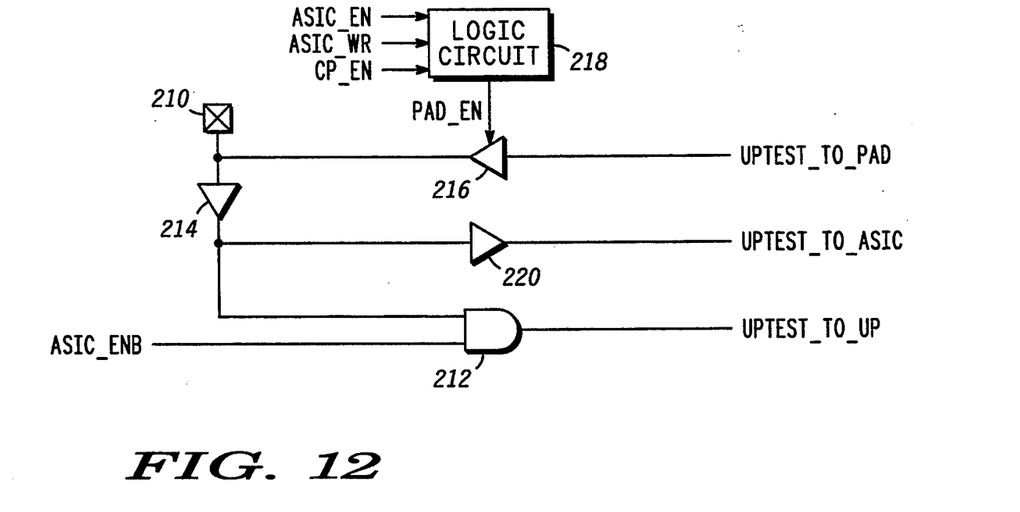

Referring to FIG. 12, a portion of ICL circuit 14 for the test mode pin of microprocessor core 12 is shown. The circuit shown in FIG. 12 includes ASIC I/O pad 210 being coupled to a first input of OR gate 212 via buffer 214. The second input of OR gate 212 is coupled to receive signal ASIC_ENB, while the output of OR gate 212 provides signal UPTEST_TO_UP. Tri-state buffer 216 has an input coupled to receive signal UPTEST_TO_PAD and an output coupled to ASIC I/O pad 210. The control input of tri-state buffer 216 is coupled to receive signal PAD_EN from logic circuit 218 wherein logic circuit 218 is responsive to input signals ASIC_EN, CP_EN and ASIC_WR. Also, the output of buffer 214 is coupled to provide signal UPTEST_TO_ASIC via buffer 220.

Referring to table 7, the mode and control Signals of ICL circuit 14 for the test mode pin of microprocessor core 12 is shown.

TABLE 7

| Mode and control signals of ICL circuit 14 for the test MODE pin of microprocessor core 12. | | | | |
|---|---|---|---|---|
| ASIC_EN | CP_EN | MODE | ASIC_WR | PAD_EN |
| 0 | 0 | 0 | X | 0 |
| 0 | 1 | 1 | X | 0 |
| 1 | X | 2,3 | 0 | 0 |
| 1 | X | 2,3 | 1 | 1 |

In mode 0, ASIC I/O pad 210 is in a tri-state condition. In mode 1, signal PAD_EN is a logic low and the supported data path is from ASIC I/O pad 210 through buffer 214 and OR gate 212 to provide signal UPTEST_TO_UP to microprocessor core 12, and also through buffer 220 to provide signal UPTEST_TO_ASIC to ASIC cell block 16.

In modes 2 and 3, signals ASIC_WR and PAD_EN are both either a logic low or a logic high. When both signals are a logic low, signal UPTEST_TO_UP is a logic low since signal ASIC_EN is a logic high. Further, in this configuration ASIC I/O pad 210 may be redefined as an ASIC input. In this configuration the supported data path is from ASIC I/O pad 210 through buffers 214 and 220 to provide Signal UPTEST_TO_ASIC.

However, when signals ASIC_WR and PAD_EN are a logic high, signal UPTEST_TO_UP is again a logic low, but ASIC I/O pin 210 may be redefined as an ASIC output because signal ASIC_WR is a logic high. In this configuration, the supported data path is from signal UPTEST_TO_PAD which is a signal from ASIC cell block 16 through tristate buffer 216 to ASIC I/O pad 210.

Figure 13:
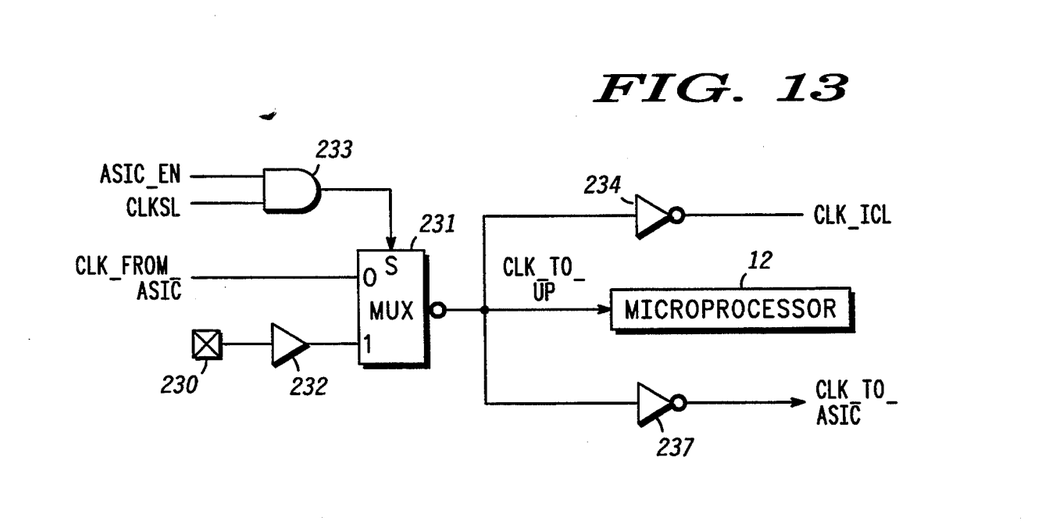

Referring to FIG. 13, a portion of ICL circuit 14 for the dock pin of microprocessor core 12 is shown. In general, the clock pin supplies the clock signal to microprocessor core 12. This same clock is also provided to ASIC cell block 16 via signal CLK_TO_ASIC and to ICL circuit 14 via signal CLK_ICL.

The circuit in FIG. 13 includes ASIC I/O pad 230 which is coupled to the first input of multiplexor 231 via buffer 232. The second input of multiplexer 231 is coupled to receive a clock signal from ASIC cell block 16 as denoted by signal CLK_FROM_ASIC. The select input of multiplexer 231 is coupled to the output of NAND gate 233 the latter having inputs for receiving signals ASIC_EN and CLKSL (a clock select signal). The output of multiplexer 231 provides a dock signal to ICL circuit 14 (signal CLK_ICL) via buffer 234. The output of multiplexer 231 also provides a clock signal to ASIC cell block 16 (signal CLK_TO_ASIC) via buffer 237 and as denoted by signal CLOCK_TO_ASIC. In addition, the output of multiplexer 231 provides a dock signal to microprocessor core 12 as denoted by signal CLK_TO_UP.

Multiplexer 231 allows a clock signal to microprocessor core 12 to be provided by ASIC cell block 16 via signal CLOCK_FROM_ASIC or from ASIC I/O pad 230. If ASIC cell block 16 is to supply the clock to microprocessor core 12, signal CLKSL should be tied high, otherwise it should be tied low. Further, signal ASIC_EN is low during mode 1 and forces the external clock pin to be used to test microprocessor core 12.

By now it should be apparent from the foregoing discussion that a novel circuit has been provided that allows for a flexible three-way interface between a microprocessor, an ASIC cell block, and the external world wherein the microprocessor and the ASIC cell block are fabricated within a gate array. The novel circuit provides an interface circuit for each I/O pin of the microprocessor to allow it to readily interface with the customer designed ASIC cell block or external devices via the ASIC I/O pads. The novel circuit also allows isolated testing of only the microprocessor, of only the ASIC cell block, or of both the microprocessor and the ASIC cell block.

The microprocessor is fully diffused and fixed-placed within the gate array while the interface circuit is fixed placed therein. Further, the ASIC cell block may be utilized by a customer to design a circuit to perform a customer defined function. Further, this customer designed gate array will readily interface with the microprocessor and the outside world via the novel interface circuit.

While the invention has been described in conjunction with specific embodiments thereof, it is evident that many alterations, modifications and variations will be apparent to those skilled in the art in light of the forgoing description. Accordingly, it is intended to embrace all such alterations, modifications and variations in the appended claims.

We claim:

1. A logic circuit for providing a flexible interface between a microprocessor, an ASIC cell block and the external world, the microprocessor circuit and the ASIC cell block being located within a gate array where the microprocessor circuit is fully diffused and fixed-placed within the gate array, the logic circuit comprising a plurality of circuits for providing an interface between a plurality of microprocessor I/O pads to the ASIC cell block and to the external world, said logic circuit being fixed-placed within the gate array, said ASIC cell block being utilized to provide customer defined predetermined functions.

2. A gate array having a plurality of I/O pads, comprising:
   a microprocessor circuit having a plurality of microprocessor I/O pads and being fully diffused and fixed-placed within the gate array;
   an ASIC cell block for providing customer defined predetermined functions; and
   an interface circuit for providing a flexible interface between said microprocessor I/O pads of said microprocessor circuit, said ASIC cell block and the plurality of I/O pads of the gate array, said interface circuit being fixed-placed within the gate array.

3. The gate array according to claim 2 further including bus mastership signals such that a portion of the plurality of I/O pads which correspond to said plurality of microprocessor pads may be redefined as inputs or outputs of the gate array.

4. The gate array according to claim 2 wherein said interface circuit utilizes cells from said ASIC cell block.

5. The gate array according to claim 2 further including first means for actively pulling outputs of said microprocessor circuit to a predetermined logic level, said first means including a tri-state buffer having an input, an output and a control input, said input of said tri-state buffer being coupled to receive a power down signal, said output of said tristate buffer being coupled to an output of said microprocessor circuit, and said control input of said tri-state buffer being coupled to receive a tri-state control signal from said microprocessor circuit.

6. The gate array according to claim 5 further including second means for actively pulling inputs of said microprocessor circuit to a predetermined logic level, said second means including an AND gate having first and second inputs and an output, said first input of said AND gate being coupled to receive said power down signal, said second input of said AND gate being coupled to receive a signal from said ASIC cell block, said output of said AND gate being coupled to an input of said microprocessor circuit.

7. The gate array circuit according to claim 2 wherein said interface circuit includes a first circuit for providing an interface for a tri-state output of said microprocessor circuit, said first circuit including:
   a multiplexer circuit having first and second inputs, a select input and an output, said first input being coupled to receive a signal from said microprocessor circuit, said second input being coupled to receive a signal from said ASIC cell block;
   a logic circuit being responsive to a plurality of control signals for providing first and second output signals, said first output signal of said logic circuit being provided to said select input of said multiplexer circuit;
   a tri-state buffer having a input and an output and a control input, said input of said tri-state buffer being coupled to said output of said multiplexer, said control input of said tri-state buffer being coupled to receive said second signal of said logic circuit, said output of said tri-state buffer being coupled to one of the plurality of IO pads of the gate array; and
   a buffer circuit having an input coupled to said output of said tri-state buffer and an output for providing a signal to said ASIC cell block.

8. The gate array circuit according to claim 2 wherein said interface circuit includes a first circuit for providing an interface for a bi-directional output of said microprocessor circuit, said first circuit including;
   a multiplexer having first and second inputs, a select input and an output, said first input of said multiplexer being coupled to receive a signal from said microprocessor circuit, said second input of said multiplexer being coupled to receive a signal from said ASIC cell block;
   a logic circuit responsive to a plurality of control signals for providing first and second output signals, said first output signal being provided to said select input of said multiplexer;
   a first tri-state buffer having an input, an output and a control input, said input of said first tri-state buffer being coupled to said output of said multiplexer, said control input of said first tri-state buffer being coupled to receive said second output signal of said logic circuit, said output of said first tri-state buffer being coupled to one of the plurality of IO pads of the gate array;

a first buffer having an input and an output, said input of said first buffer being coupled to said output of said first tri-state buffer;

a second tri-state buffer having an input, and output and a control input, said input of said second tri-state buffer being coupled to said output of said first buffer, said output of said second tri-state buffer being coupled to provide a signal to said microprocessor circuit, and said control input of said second tri-state buffer being coupled to receive a tri-state signal from said microprocessor circuit; and a second buffer having an input and an output, said input of said second buffer being coupled to said output of said first buffer, said output said second buffer being coupled to provide a signal to said ASIC cell block.

9. The gate array circuit according to claim 2 wherein said interface circuit includes a first circuit for providing an interface for synchronizing input signals to an internal clock of said microprocessor circuit, said first circuit including:

a first buffer having an input and an output, said input of said first buffer being responsive to a signal to be synchronized to the internal clock of said microprocessor circuit, said output of said first buffer providing an output signal to said ASIC cell block;

a first resistor having first and second terminals, said first terminal of said resistor being coupled to said input of said first buffer, said second terminal of said resistor being coupled to a first supply voltage terminal;

a first flip-flop circuit having a data input, a clock input and an output, said data input of said first flip-flop circuit being coupled to said output of said first buffer, said dock input of said first flip-flop circuit being coupled to receive the inversion of the internal clock signal of said microprocessor circuit;

a second flip-flop circuit having a data input, a clock input and first and second outputs, said data input of said second flip-flop circuit being coupled to said output of said first flip-flop circuit, said clock input of said second flip-flop circuit being coupled to receive the internal clock signal of said microprocessor circuit, said first and second outputs of said second flip-flop circuit respectively providing synchronized signals to said microprocessor circuit and said ASIC cell block.

10. The gate array circuit according to claim 9 further including a multiplexer being coupled between said first and second flip-flop circuits, said multiplexer having first and second inputs, a select input and an output, said first input of said multiplexer being coupled to receive a signal from said ASIC cell block, said second input of said multiplexer being coupled to said output of said first flip-flop circuit, said output of said multiplexer being coupled to said data input of said second flip-flop circuit, and said select input of said multiplexer being coupled to receive a control signal from said ASIC cell block.

11. The gate array circuit according to claim 2 further including signature logic means for testing said interface circuit when said microprocessor circuit is being tested.

* * * * *